United States Patent [19]

Ishida

[11] Patent Number: 5,243,854

[45] Date of Patent: Sep. 14, 1993

[54] METHOD OF DETERMINING FAILURE OF SENSORS IN A CONTROL DEVICE FOR AN INTERNAL COMBUSTION ENGINE

[75] Inventor: Yasuhiko Ishida, Himeji, Japan

[73] Assignee: Mitsubishi Denki K.K., Tokyo, Japan

[21] Appl. No.: 727,728

[22] Filed: Jul. 10, 1991

[30] Foreign Application Priority Data

Aug. 31, 1990 [JP] Japan .................................. 2-228025

[51] Int. Cl.$^5$ ............................................. G01M 19/00
[52] U.S. Cl. ..................................................... 73/118.1
[58] Field of Search ................................ 73/118.1, 118.2

[56] References Cited

U.S. PATENT DOCUMENTS

| | | | |
|---|---|---|---|
| 4,450,719 | 5/1984 | Nishimura et al. | 73/118.2 |
| 4,576,039 | 5/1986 | Muto et al. | 73/118.2 |
| 4,578,996 | 4/1986 | Abe et al. | 73/118.2 |
| 4,724,814 | 2/1988 | Mieno et al. | |
| 4,739,739 | 4/1988 | Wataya et al. | |
| 4,741,313 | 5/1988 | Shimomura | 73/118.2 |
| 4,823,270 | 4/1989 | Nagai | 73/118.2 |
| 5,033,290 | 7/1991 | Seki et al. | 73/118.1 |

FOREIGN PATENT DOCUMENTS 3710154 12/1988 Fed. Rep. of Germany .
639098 3/1982 Japan .

OTHER PUBLICATIONS

H. P. Lenz: "Gemischbildung bei Ottomotoren", pub. by Springer Verlag, 1990, ISBN 3-211-82193-7 pp. 286-292.

*Primary Examiner*—Robert Raevis
*Attorney, Agent, or Firm*—Sughrue, Mion, Zinn, Macpeak & Seas

[57] ABSTRACT

A method of determining failure of sensors in a control device for an internal combustion engine which comprises steps of setting a predetermined time corresponding to a warmup time of the sensors after an electric power source is activated; determining whether the predetermined time elapses from when the electric power source is activated; determining whether output signals of the sensors are in allowable ranges when the predetermined time elapses; determining the sensors as normal when the output signals of the sensors are in the allowable ranges; and determining the sensors as abnormal when the output signals of the sensors are out of the allowable ranges.

1 Claim, 2 Drawing Sheets

FIGURE 2 *PRIOR ART*
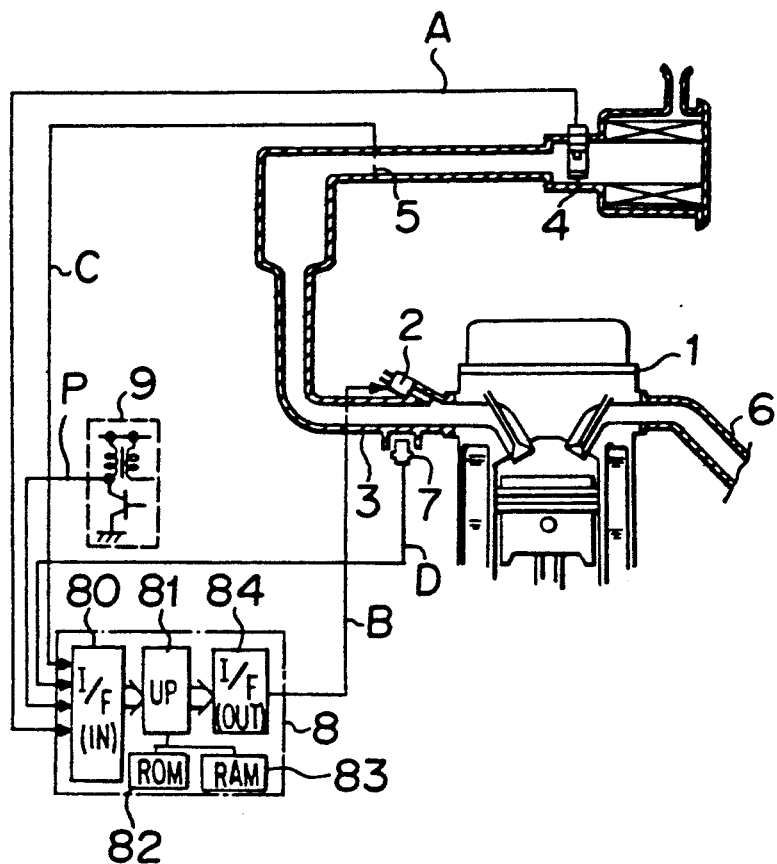

METHOD OF DETERMINING FAILURE OF SENSORS IN A CONTROL DEVICE FOR AN INTERNAL COMBUSTION ENGINE

BACKGROUND OF THE INVENTION

1. Field of the Invention

This invention relates to a method of determining the failure of sensors in a control device for an internal combustion engine to prevent an erroneous determination when an electric power is activated.

2. Discussion of the Background

FIG. 2 is a constitution diagram showing a general control device for an internal combustion engine.

In this drawing, a numeral 1 designates a cylinder which drives an internal combustion engine, 2, an electromagnetic drive type injector (fuel injection valve) which supplies fuel, 3, an intake pipe which supplies air to the cylinder 1, 4, a hot wire type air-flow sensor which detects an air quantity sucked into the cylinder 1, 5, and intake air throttle valve which controls the air quantity sucked into the cylinder 1, 6, and exhaust pipe which discharges exhaust gas from the cylinder 1, and 7, a water temperature sensor which detects a temperature of the cylinder 8 based on that of cooling water.

The injector 2, the air flow sensor 4, the intake air throttle valve 5, and the water temperature sensor 7, are respectively disposed at the intake pipe 3. The injector 2 and the water temperature sensor 7 are disposed adjacent to the cylinder 1.

A numeral 8 designates a control device which controls, for instance, fuel injection quantity or the like based on signals from various sensors, which is equipped with an input interface 80 which receives signals, a microprocessor 81 which performs a calculation of input signals, a ROM 82 which stores a calculation program or the like, a RAM 83 which temporarily memorizes data in calculation, and an output interface 84 which outputs a control signal B or the like based on a calculation result.

A numeral 9 is an ignition device which ignites the cylinder 1 at a predetermined rotation angle, which also functions as a rotation sensor of the internal combustion engine, and which outputs an electric pulse corresponding to a rotation signal at every predetermined rotation angle as a pulse signal P.

The opening degree signal C from the intake air throttle valve 5 and the temperature signal D from the water temperature sensor 7 are inputted to the control device 8 with output signals from other sensors, not shown.

Next, explanation will be given to a control operation of fuel injection of the control device for an internal combustion shown in FIG. 2.

In the hot wire type air-flow sensor 4, a hot wire is installed at an intake air passage, a supply current thereof is controlled by a feed back control so that a hot wire temperature is maintained at a constant value (for instance, 160° C.), and the supply current value to the hot wire is converted to an electric voltage and is outputted as an air quantity signal A. Accordingly, when air flow quantity is large and the cooling effect thereof is large, since the supply current is large, the level of the air quantity signal A is also enhanced. On the contrary, when the air flow quantity is small and the cooling effect thereof is small, since the supply current is small, the level of the air quantity signal A is diminished.

The control device 8 calculates a fuel quantity to be supplied to the cylinder 1 based on the air quantity signal A from the air flow sensor 4. At this time, a rotation pulse frequency number, that is, a rotation number of the internal combustion engine, is obtained based on the pulse signal P from the ignition device, and the fuel quantity per revolution is calculated. Furthermore, synchronizing with the pulse signal P, the control signal B having a required pulse width corresponding to a required fuel quantity, is applied to the injector 2.

Furthermore, a required air fuel ratio of the internal combustion engine, is necessary to be set to a rich side when the temperature of the cylinder 1 is low. The control device 8 corrects to increase the pulse width of the control signal B which is applied to the injector 2, based on the temperature signal D from the water temperature sensor 7. Furthermore, the control device 8 detects an acceleration state of the internal combustion engine based on the opening degree signal C from the intake air throttle valve 5, and corrects to increase the air fuel ratio to the rich side in the acceleration time.

Furthermore, the control device 8 always checks whether signals from various sensors are in allowable ranges. The control device 8 determines that the sensors are out of order in case that those signals are out of the allowable ranges, and stops the usage of the abnormal sensors. For instance, an upper limit value and a lower limit value of each sensor are predetermined. A failure of a sensor is detected when the value of the output signal of the sensor is equal to, or more than the upper limit value, and when the value is equal to or less than lower limit value.

However, a value of an output signal of each sensor may not be stabilized just after an electric power source is activated and may show an abnormal value. Therefore the control device 8 may perform an erroneous determination of a failure of the sensor. Particularly, in case of the air-flow sensor 4, the hot wire is cool just after the electric power source is activated. The hot wire must be heated by the supply current. Before such warmup the air quantity signal A assumes an abnormal value above a normal one and the possibility of an erroneous determination of the failure of the sensor is increased. When an erroneous determination is made that a sensor is in failure, the control device 8 is in the state in which a normally functional sensor is not utilized, which lowers the reliability of the control device 8.

In the conventional method of determining a failure of a sensor in a control device for an internal engine, as stated above, the value of the output signal of the sensor is compared with an allowable range for determining a failure of the sensor. Therefore, there is a possibility of an erroneous determination of the failure by an abnormal operation of sensors when an electric power source is activated, which impairs the reliability of control.

SUMMARY OF THE INVENTION

It is an object of the present invention to provide a method of determining failure of sensors in a control device for an internal combustion engine capable of avoiding a failure determination based on an abnormal output signal of the sensor when an electric power source is activated, preventing an erroneous determination of the failure of the sensor, and enhancing a reliability in the detection of failure and the control thereof.

According to an aspect of the present invention, there is provided a method of determining failure of sensors in a control device for an internal combustion engine which comprises steps of:

setting a predetermined time corresponding to a rise time of the sensors when an electric power source is activated;

determining whether the predetermined time elapses from when the electric power source is activated;

determining whether output signals of the sensors are in allowable ranges when the predetermined time elapses;

determining the sensors as normal when the output signals of the sensors are in the allowable ranges; and determining the sensors as abnormal when the output signals of the sensors are out of the allowable ranges.

BRIEF DESCRIPTION OF THE DRAWINGS

FIG. 2 is a constitution diagram showing a general control device for an internal combustion engine.

DETAILED DESCRIPTION OF THE PREFERRED EMBODIMENTS

Figure 1:
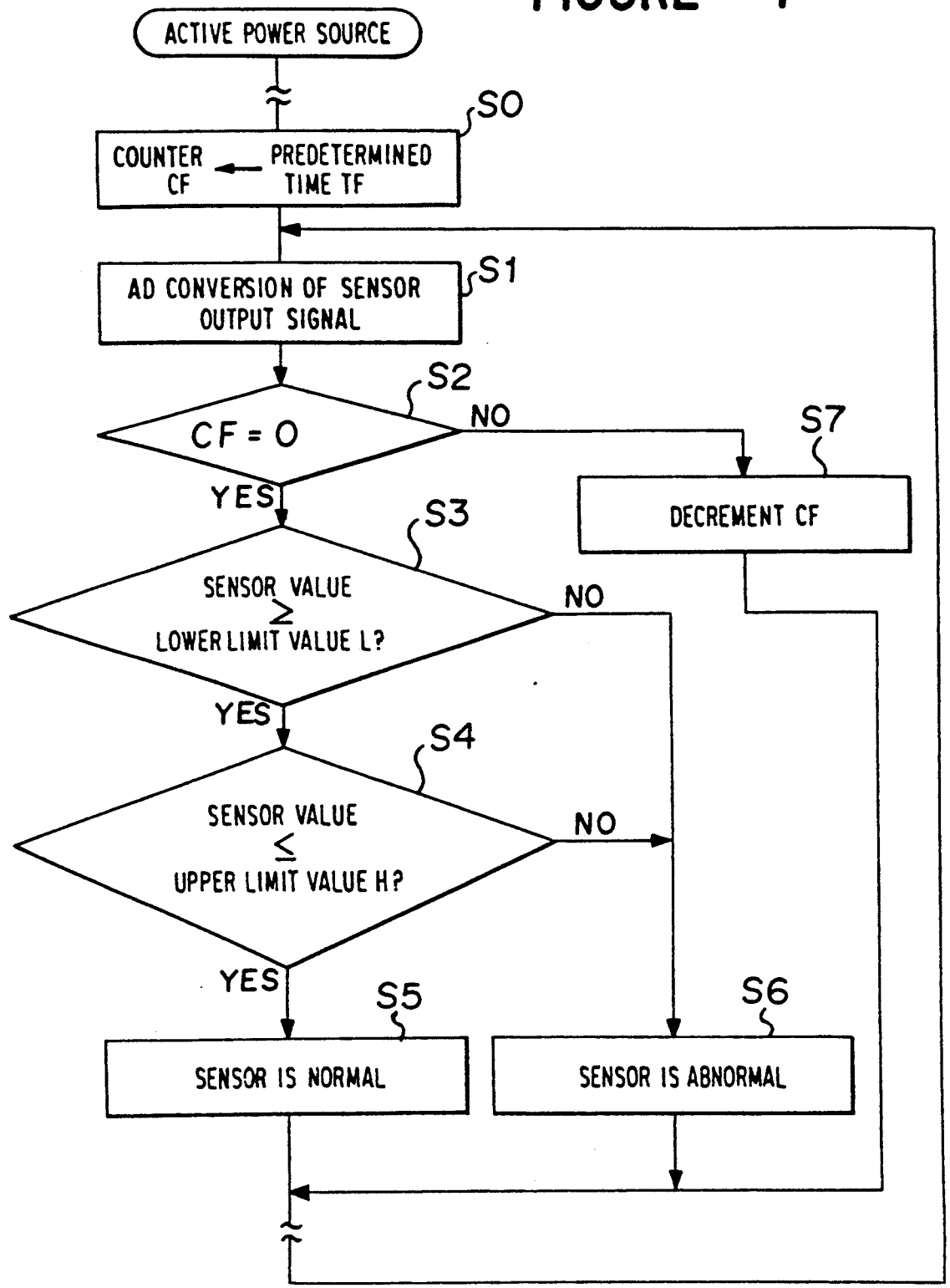
FIG. 1 is a flow chart showing an embodiment of the present invention.

Explanation will be given to an embodiment of the present invention referring to the drawings.

FIG. 1 is a flow chart showing an embodiment of a failure determination routine according to the present invention. The device to which this invention is applied, is as shown in FIG. 2. A part of a calculation program stored in the ROM 82 of the control device 8 is changed. First of all, a predetermined time TF is set to a counter CF which corresponds to the rise or warmup time of a sensor after the electric power source is activated (step S0). For instance, in case of the air-flow 4 the predetermined time TF is set to a time in which the output signal, that is, the air quantity signal A is stabilized (about 3 seconds).

In this case, the counter CF is a down counter. The failure determining routine is a timer routine which is iterated at every constant time. Accordingly, the counter CF is decremented at every performing of the routine, and becomes zero after the predetermined time TF.

Next, a sensor output signal (for instance, the air quantity signal A) is AD converted and stored in the RAM 83 (step S1). Furthermore, depending on whether the value of the counter CF is 0, a determination is made whether the predetermined time TF has elapsed from when the electric power source is activated (step S2).

When the counter CF is 0, a determination is made that the predetermined time TF has elapsed after the electric power source is activated, and a determination is made whether the output signal of the sensor (sensor value) has a value in an allowable range.

Accordingly, the operation determines whether the sensor value is equal to or more than a lower limit value L, (step S3). When the sensor value is equal to, or more than the lower limit value L, the operation determines whether the sensor value is equal to, or lower than an upper limit value H (step S4). When the sensor value is equal to, or lower than the upper limit value H, the operation regards that the sensor value is in the allowable range, and determines the sensor as normal (step S5).

On the contrary, when the sensor value is lower than the lower limit value L, or higher than the upper limit value H, the operation regards that the sensor value is out of the range, and determines the sensor as abnormal (step S6).

After the normality or the abnormality of the sensor is determined, the operation returns to the reading step S1 of the output signal of the sensor. Since the counter CF is 0 already, the operation goes from the determining step S2 of the counter CF, to the determining steps S3 and S4 of the sensor, by which the determination of the existence of the failure of the sensor, is iterated. These failure determining steps S1 and S3 to S6, in normal time, are the same as in the conventional case.

On the contrary, when a determination is made that the counter CF is not 0 in step S2, since the predetermined time of TF has not elapsed from when the electric power source was activated, the counter CF is decremented (step S7). After this step, the operation bypasses through the determining routine of the sensor, and returns to the step S1. Accordingly, the failure determining routine is iterated, until the predetermined time TF, and the value of the counter CF, become 0.

By this method, the failure determining treatment of the sensor is stopped during the predetermined time of TF just after the electric power source is activated, and the erroneous determination of the failure of the sensor is prevented. Accordingly, a sound or reliable sensor is always used in the control, which enhances not only the reliability of the failure detection but the reliability of the control.

Furthermore, in the above embodiment, a case is shown in which an erroneous determination of the hot wire type air-flow sensor 4, is prevented. However, this invention is applicable to the other sensors with the same effect, when the operation of the sensor just after the electric power source is activated, is unstable.

As stated above, according to the present invention, a step of setting a predetermined time corresponding to a rise time of a sensor when an electric power source is activated, a step of determining whether the predetermined time has elapsed after the electric power source is activated, a step of determining whether an output signal of the sensor is in an allowable range in case that the predetermined time has elapsed, a step of determining the sensor as normal in case that the output signal is in the allowable range, and a step of determining the sensor as abnormal in case that the output signal is out of the allowable range, are provided. In this invention, the failure determining treatment of the sensor is stopped during a certain time just after the electric power source is activated, and a failure determination based on an abnormal output signal of the sensor when the electric power source is activated, is avoided. Therefore, the erroneous determination of the failure of the sensor is prevented, and this invention has an effect in which a method of determining failure of the sensor in the control device for an internal combustion engine which enhances the reliability of the failure detection and the reliability of the control, is provided.

What is claimed is:

1. A method of determining the failure of a hot wire air flow sensor in a control device for an internal combustion engine, comprising the steps of:

a) setting a counter to a predetermined time corresponding to an initial warmup period of the hot wire air flow sensor when an electric power source of the engine is activated, the initial warmup period corresponding to when an output signal of the hot wire air flow sensor has stabilized;

b) repeatedly interrogating the counter to determine whether the predetermined time has elapsed from when the electric power source was activated;
c) decrementing the counter following each interrogation if the predetermined time has not yet elapsed;
d) determining whether the output signal of the sensor is within allowable upper and lower limit values when the counter has been decremented to zero;
e) judging the sensor to be normal when the output signal of the sensor is within said allowable upper and lower limit values; and
f) judging the sensor to have failed when the output signal of the sensor is above the upper limit value or below the lower limit value.

* * * * *